United States Patent [19]

Dietz

[11] Patent Number: 4,896,708
[45] Date of Patent: Jan. 30, 1990

[54] METHOD AND DEVICE FOR CUTTING OR SLOTTING RIGID MATERIAL, IN PARTICULAR WOOD

[75] Inventor: Hans Dietz, Ammerbuch-Pfäffingen, Fed. Rep. of Germany

[73] Assignee: Wurster u. Dietz GmbH u. Co., Tubingen-Derendingen, Fed. Rep. of Germany

[21] Appl. No.: 221,257

[22] PCT Filed: Oct. 14, 1987

[86] PCT No.: PCT/DE87/00466
§ 371 Date: Jun. 10, 1988
§ 102(e) Date: Jun. 10, 1988

[87] PCT Pub. No.: WO88/02683
PCT Pub. Date: Apr. 21, 1988

[30] Foreign Application Priority Data

Oct. 17, 1986 [DE] Fed. Rep. of Germany ....... 3635318
Jun. 20, 1987 [DE] Fed. Rep. of Germany ....... 3720500

[51] Int. Cl.⁴ .................. B27G 19/08; B26D 7/08; B27B 5/28; B27B 1/00
[52] U.S. Cl. .................................. 144/363; 83/102.1; 83/105; 144/369
[58] Field of Search .................. 83/102.1, 105, 671, 83/676, 871; 144/363, 369, 366, 182, 193 R

[56] References Cited

U.S. PATENT DOCUMENTS

| | | | |
|---|---|---|---|
| 700,296 | 5/1902 | Brown | 144/182 |
| 866,975 | 9/1907 | Staley | 144/182 |
| 1,644,961 | 10/1927 | Sultis et al. | 144/182 |
| 1,764,183 | 6/1930 | Rhinevault | 144/182 |
| 1,952,136 | 3/1934 | Müller | 31/25 |
| 3,448,780 | 6/1969 | Hervey | 83/105 |
| 3,583,450 | 6/1971 | Gunnerman | 83/105 |
| 3,623,520 | 11/1971 | Neild | |
| 3,884,422 | 5/1975 | Weichel | 241/279 |
| 4,210,051 | 7/1980 | Fingerle et al. | 83/871 |

FOREIGN PATENT DOCUMENTS

| | | |
|---|---|---|
| 0169399 | 6/1985 | European Pat. Off. |
| 3131122 | 2/1983 | Fed. Rep. of Germany |
| 8534533 | 12/1985 | Fed. Rep. of Germany |
| 0550414 | 1/1943 | United Kingdom |

Primary Examiner—W. Donald Bray
Attorney, Agent, or Firm—Poms, Smith, Lande & Rose

[57] ABSTRACT

A method and a device serve for cutting or slotting rigid material, in particular wood, having a modulus of elasticity of, preferably, approximately 50,000 to 400,000 kg/cm². A gap of finite width is cut into the material by a narrow tool comprising cutting elements, in particular a circular saw blade, at a cutting speed of over 40 m/s. After passage of the cutting element a timber section is always lifted off the remainder of the material and bent out of the plane of the gap. In order to reduce the thermal loading of the tool, which is generated by the friction between the timber section and the tool, the timber section is always bent off in such a manner that once the timber section has left the cutting elements, it is spaced a certain distance from the circular saw blade.

18 Claims, 3 Drawing Sheets

METHOD AND DEVICE FOR CUTTING OR SLOTTING RIGID MATERIAL, IN PARTICULAR WOOD

The present invention relates to a method and a device for cutting or slotting rigid material, in particular wood, having a modulus of elasticity of, preferably, approximately 50,000 to 400,000, in particular 80,000 to 150,000 kg/cm$^2$, in which a gap of finite width is cut into the material by a narrow tool comprising cutting elements, in particular a circular saw blade, at a cutting speed of over 40 m/s, and in which after passage of the cutting element a timber section is lifted off the remainder of the material and bent out of the plane of the gap.

A method of the described type has been known before from German Utility Model No. 85 34 533.4.

It is a known fact that when used for working wood or for working other materials having a similar modulus of elasticity, which can be worked with high cutting speeds, circular saw blades are subjected to high thermal stresses in the area of their teeth.

However, the suggestions made heretofore for reducing the stresses acting on the teeth of circular saw blades focussed mainly on the possible reduction of the dynamic mechanical stresses. During sawing, considerable compression stresses are encountered in the teeth due to their contact with the material to be cut during the cutting operation. Consequently, numerous proposals have been made to compensate these compression stresses by tensile stresses which can be produced by giving the circular saw blade a particular shape, in particular by providing openings in the circular saw blade. An example of such an arrangement has been described by German laid open print (Offenlegungsschrift) No. 31 31 122.

From the before-mentioned German Utility Model No. 85 34 533, a circular saw with a minimum cutting gap has been known comprising a circular saw blade designed with segmental spokes and a load cell arranged at the center of the latter, for loading the individual segments in a defined manner. In addition, the circular saw blade is slightly conical in the area inwardly of the saw teeth so that the timber section, after having passed the teeth, runs up against this conical surface, thus being slightly bent away from the plane of the gap. However, the timber section still remains within the reach of the circular saw blade, resting on the conical surface of the circular saw blade over a considerable length. In this contact area, considerable frictional forces occur between the rotating conical area of the circular saw blade and the bent-off timber section. Given the rates of feed normally used today in woodworking on the one hand and the usual diameters of circular saw blades on the other hand, the time during which the bent-off timber section remains in contact with the conical surface of the known circular saw blade may well be in the range of up to one second. However, this leads to considerable mechanical stressing of the circular saw blade and of the drive and to considerable thermal loading of the circular saw blade and the wood—both circumstances being factors which, as one knows today, should never be neglected.

Now, it is the object of the present invention to improve a method and a device of the type described above so as to reduce in particular the thermal loading of the tools used.

This object is achieved according to the invention, in a method of the type described above, by the feature of bending the timber section off in such a manner that once the timber section has left the cutting elements, it is spaced a certain distance from the circular saw blade.

In a device of the type described above, this object is achieved according to the invention by an arrangement in which a separating element is arranged on at least one broad side of the circular saw blade, the edge of the said separating element adjoining the teeth of the circular saw blade and its surface being profiled in such a manner that it gets thicker towards the axis of the circular saw blade and flatter towards the teeth, said surface extending approximately tangentially to the sides of the teeth.

The object underlying the present invention is solved in this manner fully and perfectly.

For, ideally, it can be ensured by the separating element or elements that the material to be cut gets into contact only with the cutting elements, for example the teeth of the circular saw blade, while any lateral friction between the other areas of the tool and the sides of the gap is avoided. This reduces drastically the friction between the tool and the material to be cut and, accordingly, the thermal loading of the tool.

This leads to the advantage that a given cutting accuracy can be assured even over an extended tool life, and of course the wear of the tool is also reduced so that an economic success is achieved simultaneously.

According to a preferred embodiment of the invention, the material to be cut is bent off on both sides of the tool.

This feature provides the advantage to reduce the friction in a particularly efficient manner because not only the part to be cut off, but also the remainder of the material is deflected out of engagement with the tool as soon as cutting has been effected.

According to another embodiment of the invention, the tool is cooled during cutting by cooling means arranged on the separating element.

This feature provides the advantage that even the unavoidable temperature rise in the area of the cutting elements can be restricted to a minimum because the heat generated during cutting is dissipated by the cooling means.

This is true in particular when the tool is cooled in the area of the cutting elements, the cooling effect acting in this case at the very place where the heat is generated.

According to certain embodiments of the invention, a separating element serving for performing the deflecting operation is provided in stationary arrangement, according to other embodiments it may, however, also be moved, in particular set to vibrate, relative to the tool.

This feature provides the advantage that depending on the given application, and depending in particular on the material to be cut, a configuration can be found which is optimally suited and which, if necessary, even reduces the frictional resistances acting against the feeding motion of the material when the latter is deflected laterally from the plane of the gap by the separating element.

According to another embodiment of the invention, a force is exerted upon the uncut material by first pressing means, in a direction substantially perpendicular to the plane of the gap, at a point immediately before the engaged cutting elements.

This feature provides the advantage that the so-called "pre-splitting" effect, i.e. uncontrolled splitting of the material in front of the actual cut, is prevented. The risk of such pre-splitting rises of course as a function of the width of the angle at which the material is deflected from the cutting plane by the separating element. This phenomenon is counteracted by the first pressing means which either act to further reduce the pre-splitting risk or permit on the other hand to provide greater deflection angles in the area of the separating element.

Another preferred variant of this embodiment of the invention distinguishes itself by the fact that the pressing means comprises a pressure beam resting on the material to be cut by a contact surface in the form of an arc of a circle.

This feature provides the advantage that the timber section being cut and being deflected is pressed by a pressure neither excessively high nor excessively low, but just corresponding to the given cutting conditions.

Accordingly, the contact pressure can be adjusted optimally so that neither an excessively high pressure is required which would lead to the development of undesirable frictional heat, nor too little pressure is adjusted to prevent safely the described pre-splitting effect.

According to another preferred embodiment of the device according to the invention, the contact surface extends over a circumferential angle corresponding substantially to the area of engagement between the cutting elements and the material to be cut.

This feature provides the advantage that the circular saw blade is subjected to the pressure over the whole area in which it is in engagement with the material to be cut so that the optimal conditions described above can be adjusted over the whole area of such engagement.

According to another improvement of the device according to the invention, the contact surface is flat and ends in an inclined entrance portion directed oppositely to the feeding direction of the material to be cut.

This feature provides the advantage that on the one hand the pressure to be applied during the pressing process can be adjusted precisely, due to the flat contact surface, while on the other hand the inclined entrance portion ensures that the material to be cut enters the cutting/pressing plane smoothly.

According to a particularly preferred arrangement, an edge of the contact surface directed oppositely to the feeding direction of the material to be cut, for example the edge between the contact surface and the inclined entrance portion, is positioned between the cutting circle and the base circle of the cutting elements.

Practical tests have shown that this arrangement of the pressing element is of particular advantage because splitting of the material could be prevented with the least possible force when the pressing element was arranged in this position.

It has further been found to be particularly advantageous if the contact surface exhibits a radial width of between one half and one twentieth of the difference between the radii of the cutting circle and the base circle of the cutting elements.

These dimensions, too, have been found in practical tests to be particularly favorable because this relatively narrow contact surface already gives the desired optimal results.

According to still another embodiment of the invention, a separating element is provided on only one side of the plane of the gap while on the other side a guiding force is exerted upon the tool by second pressing means in a direction substantially perpendicular to the plane of the gap.

This feature provides the advantage that optimum cutting accuracy can be guaranteed because the tool, in particular the circular saw blade, can be kept at any time in exactly radial alignment with the axis of rotation or movement of the tool.

According to another embodiment of the device of the invention, the position of the tool relative to the separating element is adjusted by means of a fluid agent acting upon the tool.

This feature provides the advantage to enable the tool to be adjusted dynamically, by directing fluid radially upon the separating element, in particular the circular saw blade, so that the tool can be readjusted sensitively and rapidly.

According to other preferred embodiments of the device according to the invention, the teeth end in the area of their base in a thicker edge extending over the whole circumference and being adjoined by the edge of the separating element, viewed from the axis of the circular saw blade.

This feature provides the advantage that on the one hand the edge of the separating element can be made relatively thick, which is of benefit for the mechanical stability, while on the other hand the transition from the teeth to the separating element is rendered as smooth as possible, which helps avoid disturbing edges on the feeding path of the material in a favorable manner.

According to another embodiment of the device according to the invention, the separating element is provided with a channel opening into the hollow space between the separating element and the circular saw blade.

This feature provides the advantage that on the one hand cooling of the circular saw blade is rendered possible, while on the other hand the channel may be used for effecting the dynamical adjustment of the circular saw blade described above, by exerting pressure on the blade.

If according to another improvement of this variant the hollow space is subdivided by a radial partition wall with a passage in the area of the teeth, the latter may be cooled selectively by introducing a cooling agent into the hollow space because the cold cooling agent will then flow through this passage and come into direct contact with the area of the teeth.

Finally, another group of embodiments is preferred where the profiled surface of the separating element conforms with a mathematical bending line which may be determined individually for various applications of the device, for example for soft wood (pine wood/fir) on the one hand or hard wood (oakwood/beechwood) on the other hand and which should be calculated on the basis of a relatively thick timber section of a thickness of up to 24 mm or over, for example.

This feature provides the advantage that the timber section is loaded evenly over the whole deflected length, which is in contact at any time with the separating element, so that any excessive stresses which may lead to breakage of the wood fibers are avoided.

Other advantages of the invention will become apparent from the following specification and the attached drawing.

It goes without saying that the features that have been described above and will be explained below may be used not only in the described combinations, but also in any other combination or individually, without leaving the scope of the present invention.

Certain embodiments of the invention will now be described with reference to the drawing in which.

Figure 1:
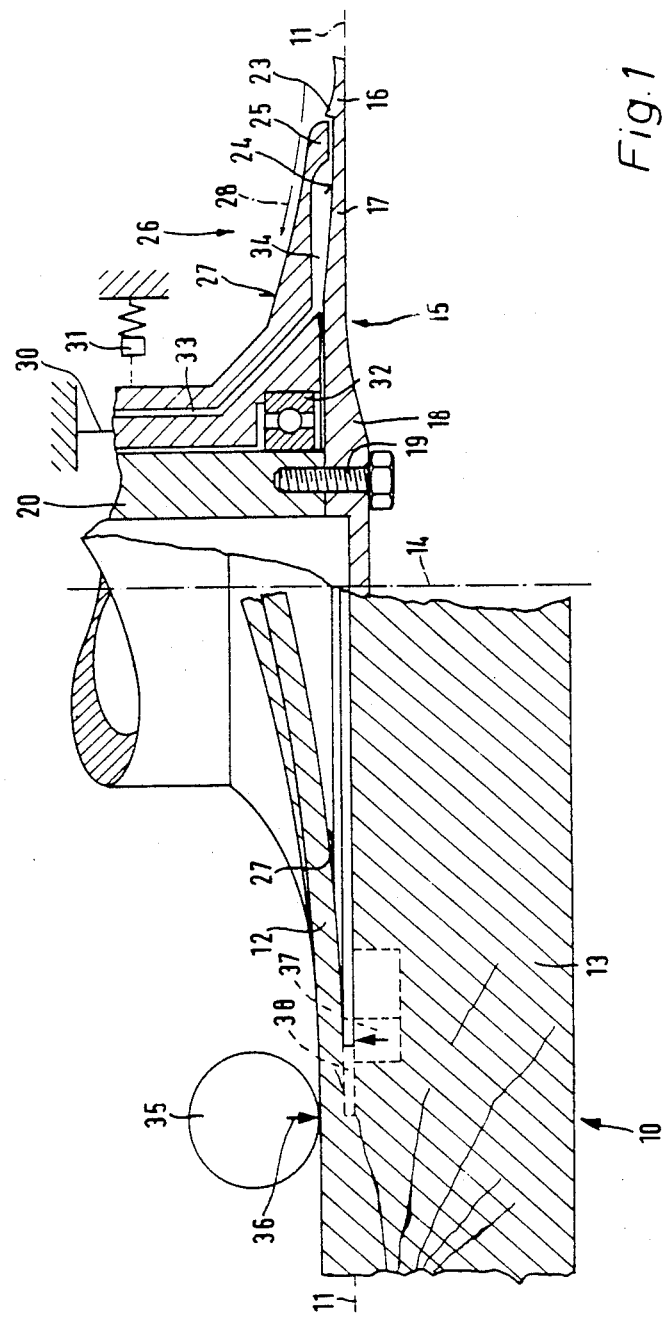
FIG. 1 is a view and partial cross-section, vertical to the axis of a circular saw, partly broken away.

In FIG. 1, reference numeral 10 designates a material to be cut being in the case of the present invention a rigid material, in particular wood, although other types of material, for example plastic materials, can also be worked with the method and device of the present invention, provided their modulus of elasticity is in the range of, preferably, approx. 50,000 to 400,000 kg/cm$^2$. Further, it must be stressed that the present invention contemplates only high cutting speeds of, preferably, over approx. 40 m/s, typically 50 to 200 m/s, and deals exclusively with cutting processes where a gap or cut of finite width is produced in a material by a tool, for cutting or slotting the latter.

In the example illustrated in FIG. 1, the material 10 is to be cut along a cutting plane 11. In the case of the illustrated example, a timber section is to be cut off the remainder 13 of a raw timber, for example of circular or any other shape.

There is provided for this purpose a circular saw blade 15 rotating about an axis 14. One can see in the right half of FIG. 1, by way of example, a tooth 16 provided on the outer periphery of the circular saw blade 15. The circular saw blade 15 comprises a narrow area 17 near its periphery and a thicker area 18 near the axis 14, for increasing the mechanical stability of the circular saw blade 15. A screw 19 is provided for fixing the circular say blade 15 against rotation on a shaft 20 which is shown diagrammatically only in FIG. 1.

The teeth 16 of the circular saw blade 15 end at the side of the axis 14 in an edge 23 extending over the full circumference and exhibiting a step facing the axis 14 and forming the transition to the flat surface 24 of the narrow portion 17. An edge 25 extending over the full periphery of a separating element designated by reference numeral 26 adapts itself closely to the inside of the edge 23. The surface 27 of the separating element 26 is profiled in the radial direction so that its distance from the flat surface 24 of the circular saw blade 15 increases towards the axis 14.

This particular configuration of the edge 23, the edge 25 of the separating element 26 adapted thereto, and the profiled surface 27 provides the possibility of an altogether continuous path of movement above the circular saw blade 15 and the separating element 26, which is indicated in the right half of FIG. 1 by arrow 28.

The connection 30 indicated only diagrammatically is meant to symbolize that the separating element 26 is stationary and fixed against rotation, which means that it does not rotate together with the circular saw blade 15. However, it is understood that the separating element 26 need not necessarily be fixed rigidly to a machine frame. Quite to the contrary, the spring/mass system indicated at 31 in FIG. 1 symbolizes that the separating element 26 itself can also move, i.e. vibrate, to enable the material to slide along the profiled surface 27 at the least possible friction, as will be explained in greater detail further below.

In order to support the separating element 26 relative to the circular saw blade 15, a ball bearing 32 or a corresponding rotary connection is provided.

The separating element 26 is further provided with a channel 33 extending preferably in the axial direction, through which a fluid, for example a liquid or a gas, can be supplied into a hollow space 34 between the separating element 26 and the circular saw blade 15. This fluid may serve either to cool the circular saw blade 15 in a manner which will be explained in more detail further below, or else to generate a pressure in the hollow space 34 and to exert thereby an axial force on the circular saw blade 15 for readjusting the radial alignment of the latter in the cutting plane 11 if this should become necessary, for example if the circular saw blade 15 is loaded asymmetrically.

In the left half of FIG. 1, reference numeral 38 indicates a gap produced by the circular saw blade 15 in the material 10. It can be further seen that a timber section 12 cut off the remainder of the material 10 is deflected laterally from the cutting plane 11, and that this deflection increases as the timber section 12 slides along the profiled surface 27 of the separating element 26 in the direction indicated by arrow 28.

The fact that the timber section 12 is bent off the cutting plane 11 may lead to an uncontrolled gap forming in front of the gap 38. In order to avoid this, first pressing means 35 are arranged laterally of the material 10 to exert a guiding force on the latter in the area of the periphery of the circular saw blade 15, in the axial direction indicated by arrow 36 in FIG. 1.

In the arrangement illustrated in FIG. 1, only one separating element 26 is provided on one side of the saw blade 15. In order to prevent the saw blade 15 from migrating to the other—in FIG. 1 the lower—side, second pressing means 37 are provided which likewise exert a substantially axial force upon the circular saw blade 15 at a point outside the area of engagement between the circular saw blade 15 and the material to be cut 10.

Figure 2:
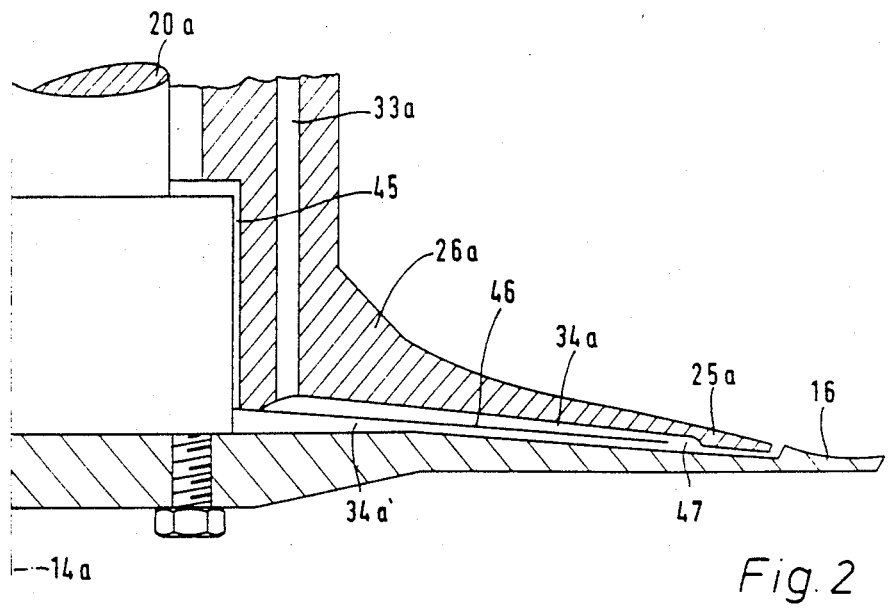
FIG. 2 shows a section through another embodiment of a circular saw, in diagrammatic form, illustrating other details of the invention.

The variant shown in FIG. 2 differs from the embodiment illustrated in FIG. 1 on the one hand in that a radial distance 45 is provided between the shaft 20a and the separating element 26a, for preventing the separating element 26 from being entrained by the revolving shaft 20a.

The hollow space 34 indicated in FIG. 1 is subdivided in FIG. 2 into two hollow spaces 34a, 34a', by a partition wall 46. The partition wall 46 is connected with the separating element 26a near the axis 14a over its whole circumference while at the outer periphery of the annular partition wall 46 a communication area 47 remains between the hollow spaces 34a and 34a'. The area 47 is located near the teeth 16 and the edge 25a of the separating element 26a. Now, when a cooling agent is introduced via the channel 33a into the partial hollow space 34a situated above the partition wall 46, the cooling agent will flow through the communication area 47 into the lower partial hollow space 34a', with the consequence that in particular the teeth 16a are cooled directly. If, on the other hand, the agent introduced through the channel 33a is used for deflecting the circular saw blade 15 in the axial direction, the location of the area 47 has the effect to provide a particularly long lever arm, measured from the axis 14a.

Figure 3:
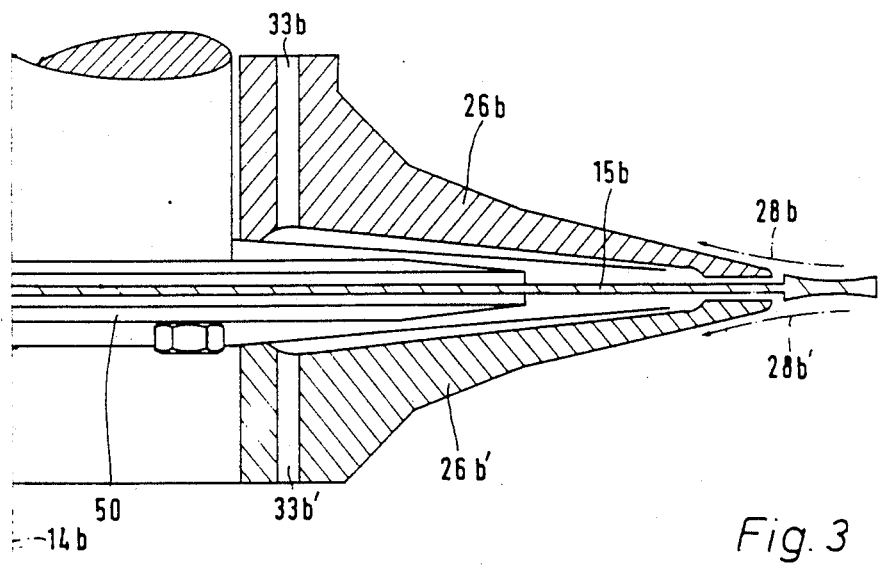
FIG. 3 is a view similar to that of FIG. 2, but with separating elements arranged symmetrically on both sides of a circular saw blade.

The embodiment shown in FIG. 3 differs from the embodiments described above mainly insofar as separating elements 26, 26b, 26b' are provided on both sides of the circular saw blade 16b. As indicated by arrows 28b, 28b', this provides two symmetrical paths of movement for the material to be cut which in this case is bent away from the circular saw blade 15b on both sides.

Besides, the circular saw blade 15b according to FIG. 3 is flat throughout and held by a usual flange support 50 relative to the axis 14b.

Through channels 33b, 33b', which are likewise arranged symmetrically in the separating elements 26b, 26b', an agent can be supplied again for cooling the circular saw blade 15b, now from both sides, or for the dynamic position control of the circular saw blade 15b. In this latter case, the symmetrical supply of the agent provides the advantage that it permits to control the position of the circular saw blade 15b in both axial directions in a most effective way.

Figure 4:
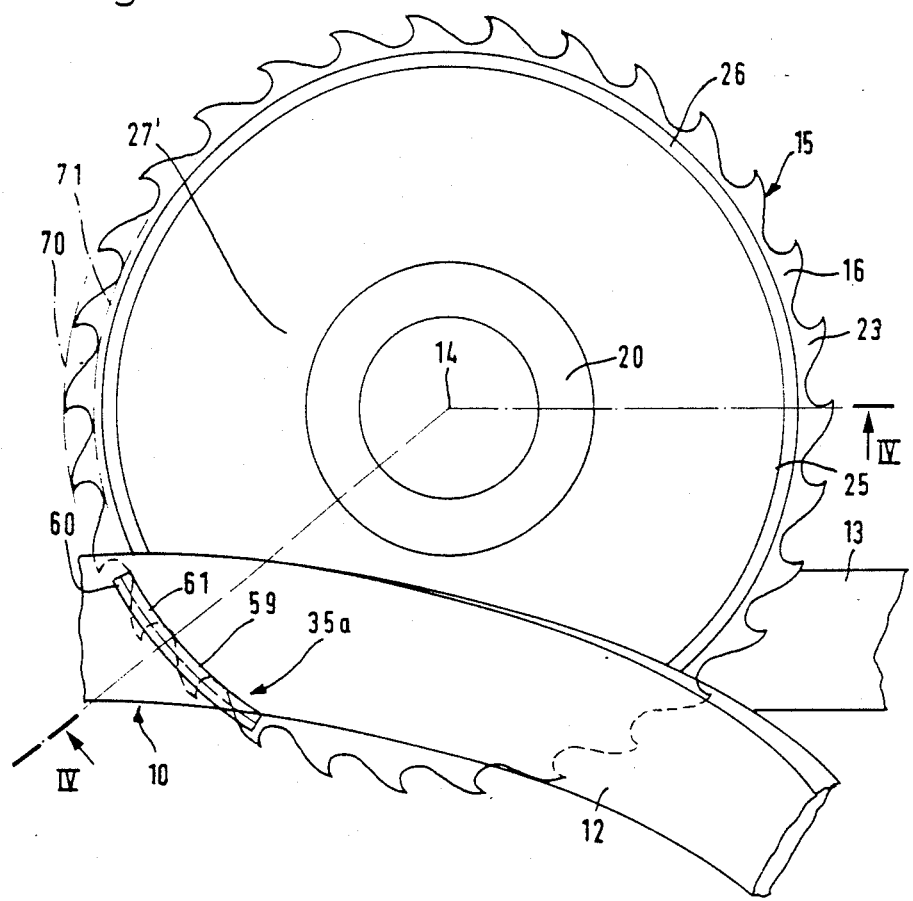
FIG. 4 is a sectional view, taken along line IV—IV in FIG. 5, of another embodiment of a device according to the invention.
Figure 5:
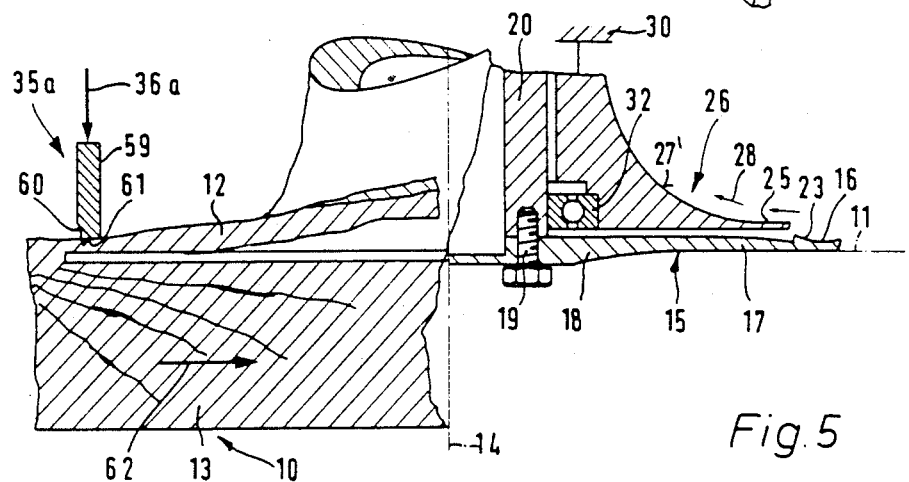
FIG. 5 shows a side view of the device represented in FIG. 4.

The embodiment shown in FIGS. 4 and 5 provides in addition that the profiled surface 27' follows a mathematical bending line. It is a known fact that according to the rules of theoretical mechanics, it is possible to determine for a beam of known thickness and known modulus of elasticity, which is clamped at one end, the bending line, i.e. the contour of the bent beam that will result when a force is exerted on the free end of the clamped beam vertically to the clamping direction.

One can take advantage of this theory insofar as, by determining, for example when working soft wood, typically pine or fir, the mathematical bending line on the basis of an ample thickness of the section to be cut, for example up to 24 mm or over. Correspondingly, one may determine a second bending line for another application in the hardwood-working field, for example for oakwood or beechwood, using, for example, the same beam thickness, and then produce two different separating elements 26 with correspondingly profiled surfaces 27', based on the results of such calculations, so that two different separating elements optimized for the two before-mentioned applications are obtained. The separated timber section is then guided along the surface of the separating element 26 in conformity with its natural bending line or, in the case of a thinner timber section, it will be bent even less so that the bending load will be distributed evenly over the axial length of the timber section.

Another important group of features of the embodiments illustrated in FIGS. 4 and 5 manifests inself in the design of the pressing means 35a acting in the area of engagement between the teeth 16 of the circular saw blade 15 and the material to be cut 10.

The pressing means 35a exerts a suitable pressure upon the surface of the material 10 in a direction perpendicular to the plane of the circular saw blade 15, as indicated by arrow 36a in FIG. 5. This can be effected by special pressing devices, for example hydraulic piston-and-cylinder units which also enable the pressure to be varied or modulated according to predetermined process parameters, for example for influencing the pressing operation by superimposition of a vibrating movement. Normally, it will however suffice to generate the pressure by delivering the pressing means 35 with undersize, i.e. adjusting the distance between the pressing means 35a and the surface of the saw blade 15 smaller than the dimension that would correspond to the thickness of the timber section 12 to be cut off.

The pressing means 35a illustrated in FIGS. 4 and 5 comprises a pressure beam 59 extending over a given circumferential angle in the form of an arc of a circle. From FIG. 5 it appears that the lower end of the pressure beam 59 may project beyond the width of the material 10, while it is shown at the upper end that the beam 59 may also be narrower, depending on the conditions of the particular case. Usually, the pressure beam 59 will be sized similar to the lower end in FIG. 5, so that it is sufficiently long in the circumferential direction for materials 10 of different widths, i.e. so that normally it will projeect beyond the material 10 on both sides.

The cross-sectional representation of FIG. 4 shows that the pressure beam 59 is provided at its lower end with an inclined entrance portion and a flat contact surface 61, the inclined entrance portion 60 being directed in a direction opposite the feeding direction 62 of the material 10. This has the effect that the material 10 enters at first the area of the inclined entrance portion 60, without any risk of getting jammed, and is then guided into the area of the contact surface 61. From the representation of FIG. 5 it appears that the radial position of the pressure beam 59 relative to the surface of the circular saw blade 15 conveniently is selected in such a manner that the contact surface 61 is arranged between the outer cutting circle 70 and the tooth base circle 71 of the circular saw blade 15.

It be assumed for a typical embodiment of the invention that the difference between the radii of the circles 70 and 71, i.e. the height of the teeth 16, is approx. 20 mm; the radial width of the contact surface 61 is in this case conveniently between 1 and 5 mm, with the edge at the transition between the contact surface 61 and the inclined entrance portion 60 coinciding conveniently with the radius of the cutting circle 70 or being slightly offset from the latter radially inwardly, by up to 20 mm. However, deviations from these data are or course possible, depending on the conditions of the particular case.

I claim:
1. A method of cutting wood, comprising the steps of:
   selecting an elongate piece of wood having a modulus of elasticity between 50,000 and 400,000 kg/cm$^2$;
   cutting an elongate slot into said piece of wood using a circular saw blade having a plurality of spaced peripheral cutting teeth at a cutting speed exceeding 40 m/s thereby dividing said piece of wood into a first and a second section; and
   bending said first section away from said slot to liftoff said first section from said saw blade immediately after the formation of said slot.
2. The method according to claim 1, wherein the step of bending includes the step of simultaneously bending both said first and second sections away from said slot.
3. An apparatus for cutting elongate pieces of wood, said pieces of wood having a modulus of elasticity between 50,000 and 400,000 kg/cm$^2$, comprising:
   a circular saw blade having a plurality of spaced peripheral cutting teeth;
   drive means for rotating said circular saw blade about an axis at a cutting speed of said teeth exceeding 40 m/s; and
   stationary bending means arranged on a broad side of said circular saw blade and having an edge adjoining said cutting teeth, said bending means having a radially profiled surface with a thickness increasing towards said axis and decreasing toward said cutting teeth to extend tangentially towards said teeth, whereby said saw blade can be used to cut a slot into said pieces of wood dividing each piece into a piece of wood having a first and second section and whereby said first section is lifted from said saw blade immediately after the formation of said slot.

4. The apparatus of claim 3, wherein said teeth protrude from said circular saw blade with a thick base edge extending circumferentially about said saw blade and being adjoined by said edge of said bending means, as viewed from said axis of said circular saw blade.

5. The apparatus of claim 3, wherein said bending means is provided with a channel opening into a cavity between said bending means and said circular saw blade.

6. The apparatus of claim 5, wherein said cavity is subdivided by a radial partition wall having a passage therein adjacent said cutting teeth.

7. The apparatus of claim 5, wherein said bending means are arranged on both sides of said circular saw blade.

8. The apparatus of claim 5, wherein said circular saw blade gets thicker towards said axis.

9. The apparatus of claim 5, wherein first pressing means are provided at the periphery of said circular saw blade, said first pressing means acting in a direction of said axis to press on said piece of wood prior to coming into contact with said cutting teeth.

10. The apparatus of claim 5, wherein one bending means is provided on one broad side of said circular saw blade, second pressing means being provided on the opposite broad side of said circular saw blade, said second pressing means acting in a direction of said axis to press on said piece of wood prior to coming into contact with said cutting teeth.

11. The apparatus of claim 9, wherein said first pressing means comprise a pressure beam resting on said piece of wood to be cut, said beam having a contact surface in the form of an arc of a circle.

12. The apparatus of claim 11, wherein said contact surface extends over a circumferential angle corresponding substantially to an area of engagement between said cutting teeth and said piece of wood.

13. The apparatus of claim 12, wherein said contact surface is flat and ends in an inclined entrance portion directed oppositely to a feeding direction of said piece of wood to be cut.

14. The apparatus of claim 11, wherein an edge of said contact surface directed oppositely to a feeding direction of said piece of wood to be cut is positioned between a cutting circle and a base circle of said cutting teeth.

15. The apparatus of claim 14, wherein said contact surface has a radial width of between one half and one twentieth of the difference between the radii of said cutting circle and said base circle of said cutting teeth, respectively.

16. The apparatus of claim 11, wherein said profile surface conforms to a mathematical bending line of said piece of wood.

17. The apparatus of claim 16, wherein said bending line is designed for a timber section consisting of pinewood/firwood exceeding 24 mm thickness.

18. The apparatus of claim 16, wherein said bending line is designed for a timber section consisting of oakwood/beechwood exceeding 24 mm thickness.

* * * * *